United States Patent
Schwartz et al.

(10) Patent No.: US 7,179,039 B2
(45) Date of Patent: Feb. 20, 2007

(54) VIBRATION-DAMPING RING INSERT ARRANGEMENT AND COMPONENT CONNECTION ARRANGEMENT INCORPORATING THE SAME

(75) Inventors: Helmut Schwartz, Weil der Stadt (DE); Bernard Homner, Calw (DE)

(73) Assignee: Schwarz Verbindungs-Systeme GmbH, Althengstett (DE)

( * ) Notice: Subject to any disclaimer, the term of this patent is extended or adjusted under 35 U.S.C. 154(b) by 0 days.

(21) Appl. No.: 10/718,530

(22) Filed: Nov. 24, 2003

(65) Prior Publication Data

US 2004/0101360 A1    May 27, 2004

(30) Foreign Application Priority Data

Nov. 26, 2002   (DE) .......................... 202 18 301 U

(51) Int. Cl.
*F16B 43/02* (2006.01)
*F16L 5/02* (2006.01)

(52) U.S. Cl. ................ 411/542; 411/369; 411/353; 411/352; 411/371.1; 411/903; 411/999; 16/2.1

(58) Field of Classification Search ............... 411/352, 411/353, 371.1, 369, 542, 999, 900–903; 16/2.1
See application file for complete search history.

(56) References Cited

U.S. PATENT DOCUMENTS

| | | | | |
|---|---|---|---|---|
| 2,290,678 | A * | 7/1942 | Dodge | 403/224 |
| 2,663,895 | A * | 12/1953 | Petri | 16/2.1 |
| 2,753,610 | A | 7/1956 | Miller | |
| 2,787,486 | A * | 4/1957 | Thiry | 403/224 |
| 2,827,303 | A * | 3/1958 | Herbenar | 280/124.136 |
| 3,300,257 | A * | 1/1967 | Selker et al. | 384/144 |
| 3,568,901 | A * | 3/1971 | McNitt | 223/111 |
| 3,801,209 | A * | 4/1974 | Matsuoka | 403/225 |
| 3,895,408 | A * | 7/1975 | Leingang | 16/2.1 |
| 4,522,378 | A * | 6/1985 | Nelson | 267/141.4 |
| 4,974,888 | A | 12/1990 | Childers | |
| 5,103,529 | A * | 4/1992 | Konig | 16/2.1 |
| 5,143,456 | A * | 9/1992 | Jordens et al. | 384/275 |
| 5,261,650 | A * | 11/1993 | Hein | 267/220 |
| 5,286,014 | A * | 2/1994 | Chakko | 267/293 |
| 5,397,112 | A * | 3/1995 | Roth et al. | 267/140.12 |
| 5,537,714 | A * | 7/1996 | Lynch et al. | 16/2.1 |

(Continued)

FOREIGN PATENT DOCUMENTS

CH          210639          10/1940

(Continued)

OTHER PUBLICATIONS

English Language Abstract of DE 29920495.

(Continued)

*Primary Examiner*—Katherine Mitchell
(74) *Attorney, Agent, or Firm*—Greenblum & Bernstein, P.L.C.

(57) ABSTRACT

Vibration-damping ring insert arrangement includes a vibration-damping ring. A hollow cylinder member includes a first end, a second end, and an inner surface that is connected to an outer surface of the vibration-dampening ring. One of an outwardly extending edge and outwardly extending edge segments is arranged at the second end. This Abstract is not intended to define the invention disclosed in the specification, nor intended to limit the scope of the invention in any way.

9 Claims, 9 Drawing Sheets

U.S. PATENT DOCUMENTS

| | | | |
|---|---|---|---|
| 5,820,115 A * | 10/1998 | Stevenson et al. | 267/293 |
| 5,876,023 A | 3/1999 | Hain et al. | |
| 5,876,024 A | 3/1999 | Hain et al. | |
| 6,030,016 A * | 2/2000 | Rice | 296/35.1 |
| 6,328,513 B1 * | 12/2001 | Niwa et al. | 411/339 |
| 6,363,613 B1 | 4/2002 | Wolf et al. | |
| 6,409,446 B1 | 6/2002 | Schwarz | |
| 6,435,489 B1 * | 8/2002 | Rice et al. | 267/140.5 |
| 6,443,679 B1 | 9/2002 | Schwarz | |
| 6,588,820 B2 * | 7/2003 | Rice | 296/35.1 |
| 6,644,886 B2 | 11/2003 | Schwarz | |
| 7,060,900 B1 * | 6/2006 | Gretz | 16/2.1 |
| 2002/0009350 A1 * | 1/2002 | Radtke | 411/353 |
| 2002/0009351 A1 * | 1/2002 | Bondarowicz et al. | 411/353 |
| 2002/0031400 A1 | 3/2002 | Schwarz | |
| 2003/0108401 A1 * | 6/2003 | Agha et al. | 411/353 |

FOREIGN PATENT DOCUMENTS

| | | |
|---|---|---|
| DE | 3500775 | 1/1986 |
| DE | 19502732 | 11/1995 |
| DE | 19623612 | 12/1996 |
| DE | 29920498 | 3/2000 |
| DE | 29920499 | 3/2000 |
| DE | 69605212 | 3/2000 |
| DE | 29920495 | 4/2000 |
| DE | 19919573 | 11/2000 |
| DE | 20015848 | 2/2001 |
| DE | 10048889 | 11/2002 |
| EP | 0352542 | 1/1990 |
| EP | 1186794 | 3/2002 |
| GB | 2062804 | 5/1981 |

OTHER PUBLICATIONS

English Language Abstract of DE 3500775.
English Language Abstract ofDE 19919573.
English Language Abstract of DE 69605212.
English Language Abstract of DE 200 15 848.

* cited by examiner

VIBRATION-DAMPING RING INSERT ARRANGEMENT AND COMPONENT CONNECTION ARRANGEMENT INCORPORATING THE SAME

CROSS-REFERENCE TO RELATED APPLICATIONS

The present application claims priority under 35 U.S.C. § 119 of German Patent Application No. 202 18 301.7, filed on Nov. 26, 2002, the disclosure of which is expressly incorporated by reference herein in its entirety.

BACKGROUND OF THE INVENTION

1. Field of the Invention

The invention relates to a vibration-damping ring insert arrangement, and also to a vibration-damping ring insert arrangement which can be used with a connecting element. The invention also relates to a connection arrangement containing such vibration-damping ring insert arrangement for connecting two components.

2. Discussion of Background Information

Numerous detachable vibration-damped connection arrangements of various types for connecting two components exist. These are based on plug-in, lock-in, turn-in and screw-in principles.

Besides quick creation of a connection, such arrangements also have the advantage of being quickly dismantled for maintenance and repair work. They are most frequently used in aircraft and road vehicles for the attachment of interior paneling. In applications of this kind, the damping of vibrations is of particular importance, in order to prevent or reduce the transmission of undesirable oscillations or vibrations from one component to the other.

A connection arrangement of this type is described, for example, in the German utility model No. 299 20 495.2, the disclosure of which is expressly incorporated by reference in its entirety. FIG. 10 of the instant application shows excerpts of this document.

As shown in FIG. 10, the device consists of a vibration-damping ring A and two connecting elements B and C which can be connected with and removed from one another. The vibration-damping ring A has an external peripheral groove N for receiving the first component M1. In the opening of the vibration-damping ring, the first connecting element B for a threaded connection is located. The second connecting element C is a rotating headless screw which is connected with the second component M2. Special features of the first connecting element will be further explained in the context of FIGS. 5 and 8.

Another vibration-damping detachable connection arrangement for joining two components is described in the German utility model No. 200 15 848.1, which is also described un Published US Application 20020031400, the disclosure of which is also expressly incorporated by reference in its entirety. FIGS. 11A and 11B of the instant application show excerpts of this document.

FIG. 11A shows a perspective view of a retaining bolt K and a detaching part L which can be moved on the retaining bolt K, and which is operated by an activating pin M that is axially movable in the retaining bolt K. The retaining bolt K is connected with a second component M2. It has an engagement area KN into which the ends of various arms of a leaf spring arrangement BF hook (see FIG. 11B), which is attached to the first component (not shown).

The activating pin and the detaching part are not permanently connected with one another. However, they act upon one another through the opening W in the wall of the retaining bolt K to release the connection by expanding the arms A1", A2", A3" and A4" of the leaf spring.

FIG. 11B shows a perspective view of a retaining-spring arrangement BF which is connected with a sleeve BU similar to a hollow cylinder for receiving a vibration-damping ring (not shown). For reasons of simplification, the first component connected with the vibration-damping ring is not shown either.

The retaining-spring arrangement consists preferably of one part, i.e., it is made as a one piece structure. It has a base part BA, from whose outer edge spring arms (A1", A2", A3" and A4") extend. These are bent and taper towards their free end. They are also located above or below the base part BA like parts of an imaginary conical roof or imaginary pyramid with an open tip for the passage of the bolt.

The vibration-damping connection arrangements as known in the prior art have certain disadvantages, in particular with regard to their installation.

SUMMARY OF THE INVENTION

One purpose of the invention is to provide a vibration-damping or dampening ring insert arrangement which permits easy installation, especially in connection with a connecting element, as well as in arrangements for joining components to one another.

The invention provides for a vibration-damping ring insert arrangement, characterized by an open hollow cylinder of which the inner wall is connected with a vibration-damping ring, whereby the hollow cylinder has an outward-pointing edge or outward-pointing edge segments on a base surface.

The invention provides for a vibration-damping ring insert arrangement, characterized by a part similar to an open hollow cylinder with a slotted cylinder case whose inner wall can be connected with a vibration-damping ring, whereby the part similar to a hollow cylinder has an outward-pointing edge or outward-pointing edge segments on a base surface.

The hollow cylinder or the part similar to a hollow cylinder may have holding elements on the outside of its case for holding an imaginary component. The hollow cylinder may have an exterior concentric retaining groove. A closed or open securing or retaining ring can be hooked into this retaining groove. The securing or retaining ring has inward-pointing spring tappets. The vibration-damping ring may project from the hollow cylinder or the element similar to a hollow cylinder at least one base surface. The vibration-damping ring may consist of vibration-damping material, preferably elastomer or rubber. The vibration-damping ring may be permanently joined to the inner wall of the hollow cylinder or the element similar to a hollow cylinder, preferably by adhesive bonding or vulcanizing. The hollow cylinder or the element similar to a hollow cylinder may be made of metal, preferably spring steel.

A layer of anti-slip and/or vibration-damping material, preferably of rubber or elastomer, may be located on the edge or the edge segments, preferably by adhesive bonding or vulcanizing. A first connecting element may be located in or at the opening of the vibration-damping ring, which can be connected with an imaginary second connecting element. The first connecting element may be part of a detachable threaded connection, part of a detachable retaining spring/retaining-bolt connection, or part of a detachable retaining screw-bolt/locking-bolt connection. The first connecting element, as part of a threaded connection, may be a threaded-connection securing device known in the art, which has two locking rings which are pressed together by spring force and interlock with one another, of which the first can be connected with and turn with an imaginary second connecting element in the form of a headless screw, and of which the second can be moved by spring force in axial direction against the first and is not capable of rotation.

The first connecting element, as part of a retaining spring/retaining-bolt connection, is a retaining-spring arrangement known in the art, which is located in or at an opening of the vibration-damping ring, whereby the retaining-spring arrangement has a base part with an opening for the passage of an imaginary retaining bolt, whereby spring arms, which are bent and which taper towards their free end, extend from the outer edge of the base part, and which are located above or below the base part like parts of an imaginary conical roof or imaginary pyramid with an open tip for the passage of the bolt. The retaining-spring arrangement can be connected with a sleeve located in the opening of the vibration-damping ring.

The first connecting element, as part of a retaining screw-bolt/locking-bolt connection may be a bolt connector known in the art located in the opening of the vibration-damping ring, which has a housing with an inner taper tapering towards its opening for receiving the end of the imaginary retaining screw bolt, that at least two shell-shaped threaded-nut segments are located in the housing, whose outer cases each have a bevel to fit the interior taper, that the threaded-nut segments with their outer casing can be moved on the interior taper towards or away from the housing opening, that the threaded-nut segments are subjected to spring force towards the housing opening, that the imaginary retaining screw bolt can be pushed against the force of the spring between the movable threaded-nut segments in such a way that its thread locks into that of the threaded-nut segments, and that the retaining screw-bolt thread can be connected with the thread of the threaded-nut segments by turning the retaining screw-bolt.

The base part of the retaining-spring arrangement may have outward-pointing projections which extend beyond the outer diameter of the hollow cylinder or the part similar to a hollow cylinder.

The invention also provides for a detachable vibration-damping connection arrangement between two components with openings aligned towards one another, characterized by a vibration-damping ring insert arrangement of the type described above wherein the first component is connected to the vibration-damping ring insert arrangement and the second component is connected to the second connecting element.

The first component may be located between the edge, or between the edge segments of the hollow cylinder or part similar to a hollow cylinder, and a securing part is connectable with this or with retaining elements extending from the part similar to a hollow cylinder. The hollow cylinder or the part similar to a hollow cylinder can be compressed elastically and temporarily to reduce its outer diameter at the compressed point. The second connecting element may be known in the art and may be a rotatable headless screw which can be connected with the second component. The second connecting element may be known in the art and may be a bolt with a hook-in area for the ends of the springs of the retaining-spring arrangement. The second connecting element may be a retaining screw bolt which can be connected with the second component.

The invention also provides for a vibration-damping ring insert arrangement, comprising a vibration-dampening ring. A hollow cylinder member comprises a first end, a second end, and an inner surface that is connected to an outer surface of the vibration-dampening ring. One of an outwardly extending edge and outwardly extending edge segments is arranged at the second end.

The arrangement may further comprise a plurality of holding elements extending outwardly from an outer surface of the hollow cylinder member, whereby the plurality of holding elements are adapted to secure the hollow cylinder member in an opening of a component. Each holding element may comprise a resilient retaining member. The hollow cylinder member may comprise an external circumferential retaining groove. The arrangement may further comprise one of a securing ring and a retaining ring configured to engage the external circumferential retaining groove. The arrangement may further comprise inwardly extending spring tappets arranged on one of the securing or the retaining ring. The arrangement may further comprise one of a securing ring and a retaining ring configured to engage an outer circumferential surface of the hollow cylinder member. The arrangement may further comprise inwardly extending spring tappets arranged on one of the securing or the retaining ring. The outwardly extending edge or the outwardly extending edge segments may extend substantially perpendicular to an axis running through the hollow cylinder member.

The vibration-damping ring may comprise a first annular projecting portion and a second annular projecting portion and the first annular projecting portion may extend beyond the first end of the hollow cylinder member by a given amount. The vibration-damping ring may comprise a first annular projecting portion and a second annular projecting portion and the second annular projecting portion may extend beyond the second end of the hollow cylinder member by a given amount. The vibration-damping ring may comprise a first annular projecting portion and a second annular projecting portion and the first and second annular projecting portions may extend respectively beyond the first and second ends of the hollow cylinder member by substantially equal amounts. The second end may comprise an annular base surface. The vibration-damping ring may comprise at least one of a vibration-damping material, an elastomer material, and a rubber material. The vibration-damping ring may be one of permanently joined and non-removably fixed to the inner surface of the hollow cylinder member. The vibration-damping ring may be connected to the inner surface of the hollow cylinder member via one of adhesive bonding and vulcanizing. The hollow cylinder member may be made of a metal. The metal may comprise spring steel.

The arrangement may further comprise one of an anti-slip material and a vibration-damping material arranged on an annular surface of one of the outwardly extending edge and the outwardly extending edge segments. The anti-slip material or the vibration-damping material may comprise one of rubber layer and an elastomer layer. The anti-slip material or the vibration-damping material may be connected to the annular surface by one of adhesive bonding and vulcanizing. The arrangement may further comprise a first connecting element arranged within the vibration-damping ring, wherein the first connecting element is adapted to be connected to a second connecting element. The arrangement may further comprise a first connecting element arranged within an opening of the vibration-damping ring, wherein the first connecting element is adapted to be connected to a second connecting element. The first connecting element may be capable of being detachably threadably connected to the second connecting element. The first connecting element may comprise a retaining spring which can be detachably connected to the second connecting element.

The arrangement may further comprise a second connecting element, wherein the second connecting element comprises one of a retaining-bolt, a retaining screw-bolt and a locking-bolt. The first connecting element may be threadably connected to the second connecting element. The first connecting element may be connected to the second connecting element via a locking connection which utilizes a spring. The first connecting element may be connected to the second connecting element via a rotatable locking connection which utilizes a spring. The first connecting element may be connected to the second connecting element via an axially movable non-rotatable locking connection which utilizes a spring. The first connecting element may comprise a sleeve portion arranged within the vibration-damping ring and a retaining-spring portion comprising a plurality of spring fingers which extend beyond the second end. The second connecting element may comprise a retaining bolt having groove which receives the plurality of spring fingers. Free ends of the plurality of spring fingers may taper towards one another. The first connecting element may comprise a housing having an internal taper, movable shell-shaped threaded nut segments having an external taper and a spring which biases the movable shell-shaped threaded nut segments, and the second connecting element may comprise a threaded bolt which threadably engages the movable shell-shaped threaded nut segments. The first connecting element may comprise a sleeve portion arranged within the vibration-dampening ring and a retaining-spring portion comprising a plurality of spring fingers which extend beyond the second end and a plurality of outwardly extending projections.

The arrangement may further comprise a first connecting element in an opening of the vibration-damping ring, the first connecting element being a connecting sleeve.

The invention also provides for a detachable connection arrangement for connecting a first component having an opening to a second component having an opening, wherein the connection arrangement comprises the vibration-damping ring insert arrangement described above and the first component being coupled to the second component via the vibration-damping ring insert arrangement.

The connection arrangement may further comprise a first connecting element passing through the opening in the first component and a second connecting element passing through the opening in the second component, wherein the first connecting element is connected to the second connecting element. The first component may be arranged adjacent one of the outwardly extending edge and the outwardly extending edge segments. The hollow cylinder member may be adapted to one of compress elastically and compress radially, whereby an outer diameter of the hollow cylinder member is capable of being reduced by compression.

The invention also provides for the arrangement described above in combination with first and second connecting elements which are adapted to connect together first and second components.

The first connecting element may comprise a retaining-spring arrangement and the second connecting element may comprise a bolt having a hook-in area adapted to receive spring ends of the retaining-spring arrangement. The second connecting element may comprise a retaining screw bolt adapted to be connected to the second component and to the first connecting element.

The hollow cylinder member may comprises a slot which allows the hollow cylinder member to undergo a change in diameter. The hollow cylinder member may comprise a one-piece metal member.

The invention also provides for a method of detachably connecting a first component having an opening to a second component having an opening, wherein the method comprises mounting the vibration-damping ring insert of the type described above to the first component, and connecting the second component to the first component via the vibration-damping ring insert arrangement, a first connecting element and a second connecting element.

The invention also provides for a vibration-damping ring insert arrangement, comprising a vibration-dampening ring comprising an outer circumferential surface and first and second annular projecting portions. A hollow cylinder member comprises a first end, a second end, and an inner surface that is connected to the outer circumferential surface of the vibration-dampening ring. The second end of the hollow cylinder member comprises one of an outwardly extending edge and outwardly extending edge segments. The outwardly extending edge or the outwardly extending edge segments extend substantially perpendicular to an axis running through the hollow cylinder member. The first annular projecting portion extends beyond the first end of the hollow cylinder member and the second annular projecting portion extends beyond the second end of the hollow cylinder member.

The invention also provides for a detachable connection arrangement for connecting a first component having an opening to a second component having an opening, wherein the connection arrangement comprises the vibration-damping ring insert arrangement described above and the first component being coupled to the second component via the vibration-damping ring insert arrangement.

The invention also provides for a method of detachably connecting a first component having an opening to a second component having an opening, the method comprising mounting the vibration-damping ring insert arrangement of the type described above to the first component and connecting the second component to the first component via the vibration-damping ring insert arrangement, a first connecting element and a second connecting element.

The invention also provides for a detachable connection arrangement for connecting a first component having an opening to a second component having an opening, wherein the connection arrangement comprises a vibration-damping ring insert arrangement comprising a vibration-dampening ring comprising an outer circumferential surface and first and second annular projecting portions, a hollow cylinder member comprising a first end, a second end, and an inner surface that is connected to the outer circumferential surface of the vibration-dampening ring, the second end of the hollow cylinder member comprising one of an outwardly extending edge and outwardly extending edge segments, wherein the outwardly extending edge or the outwardly extending edge segments extend substantially perpendicular to an axis running through the hollow cylinder member, wherein the first annular projecting portion extends beyond the first end of the hollow cylinder member, and wherein the second annular projecting portion extends beyond the second end of the hollow cylinder member. First and second connecting elements are adapted to connect together first and second components. The first connecting element is at least partially arranged within an opening of the a vibration-dampening ring.

BRIEF DESCRIPTION OF THE DRAWINGS

The present invention is further described in the detailed description which follows, in reference to the noted plurality of drawings by way of non-limiting exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
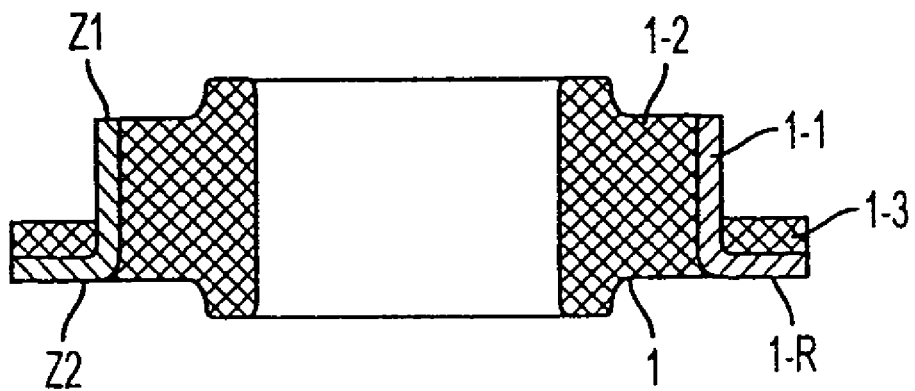
FIG. 1 shows a sectional view of the vibration-damping ring insert arrangement according to the invention with a closed hollow-cylinder casing.

FIG. 1 shows a sectional view of the vibration-damping ring insert arrangement 1 according to the invention. The arrangement 1 includes a closed hollow-cylinder casing or member 1-1. The vibration-damping ring insert arrangement 1 (see also FIGS. 4, 5 or 6) embraces or includes a vibration-damping ring 1-2 which is located inside the hollow cylinder member 1-1. The vibration-damping ring 1-2 can be permanently joined or fixed to the inner wall of the hollow cylinder 1-1, by e.g., adhesive bonding or vulcanizing. Of course, it can be connected or fixed in another desired manner. The vibration-damping ring 1-2 is made preferably of a rubber or elastomer material. Of course, other suitable materials can also be utilized provided they provide vibration dampening. The hollow cylinder 1-1 is preferably made of a metal. The metal can be, e.g., steel and preferably spring steel.

The hollow cylinder member 1-1 has a lower end z2. An edge portion 1-R projects outwardly in the area of lower end z2. The invention also contemplates, however, that in place of a continuous edge 1-R, non-continuous or outward-pointing edge segments may be provided to form the edge 1-R.

A layer, coating or washer 1-3 may be utilized or arranged on an upper surface of the edge 1-R. This layer 1-3 may have the form of an anti-slip and/or vibration-damping material, and may preferably be made of rubber or elastomer. Of course, other materials may also be utilized. This layer 1-3 is preferably permanently connected or fixed to the metal edge 1-R (or to the edge segments if such is utilized). This attachment can be realized via, e.g. adhesive bonding or vulcanizing. Again, other attachment techniques can also be utilized. The purpose of the layer 1-3 is to prevent twisting or rotation of the vibration-damping ring 1-2 and insert 1-R in relation to the component (e.g., MP1 in FIG. 4) lying against it (i.e., in the installed state). The layer 1-3 may also have the effect of absorbing vibrations.

Figure 2:
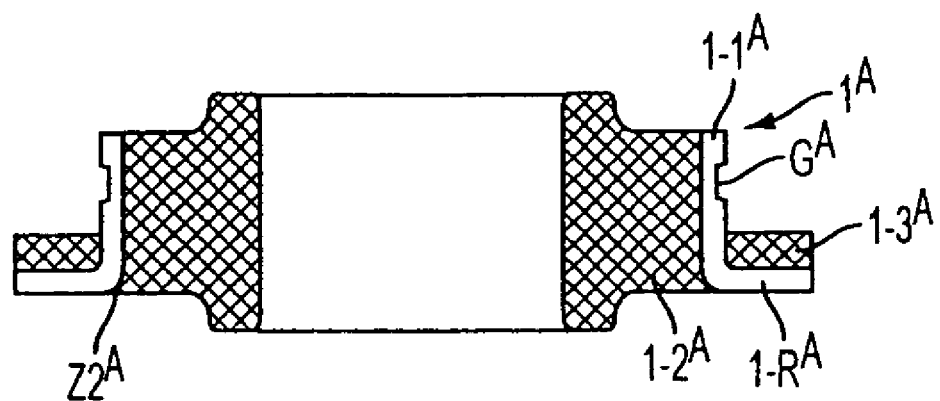
FIG. 2 shows a sectional view of the vibration-damping ring insert arrangement according to the invention with a closed hollow-cylinder casing with an external concentric retaining groove.

FIG. 2 shows a sectional view of another vibration-damping ring-insert arrangement $1^A$ according to the invention. The arrangement $1^A$ is similar to the one in FIG. 1 and also includes a retaining groove $G^A$. As can be see in FIG. 2, the vibration-damping ring insert arrangement is designated as $1^A$, the vibration-damping ring as $1$-$2^A$, the hollow cylinder as $1$-$1^A$, the edge as $1$-$R^A$. Moreover, the contact layer that is arranged on the edge is designated $1$-$3^A$. The lower end of the hollow cylinder $1$-$1^A$, from which the outward-point edge $1$-$R^A$ extends, is marked as $z2^A$. The materials of the arrangement $1^A$ can otherwise be the same as that of FIG. 1, as explained above.

A securing or retaining ring 4 (see FIG. 9) can also be utilized. The ring 4 can be open or closed and is designed to hook into the retaining groove $G^A$. In this regard, the ring 4 can have inward-pointing spring tappets 4N. The purpose of the retaining ring 4 is, of course, to fix a component in place when the component is located between the ring 4 and the edge 1-R$^A$ (see e.g., FIGS. 4, 6, 7 and 8). The inward-pointing spring tappets 4N create a force-actuated connection between the retaining ring 4 and the hollow cylinder 1-1$^A$. Of course, the ring 4 can also be utilized with hollow cylinders which do not have a groove (see e.g., FIGS. 4 and 8).

Figure 3A:
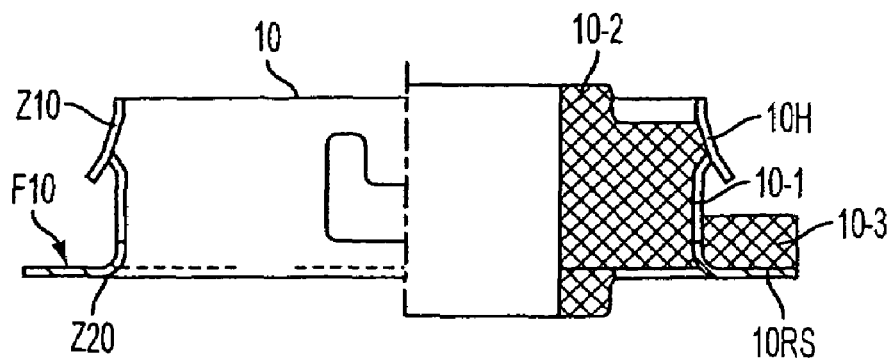
FIG. 3A shows a sectional view of the vibration-damping ring insert arrangement according to the invention with a slotted hollow-cylinder casing from which spring arms extend for gripping a component.
Figure 3B:
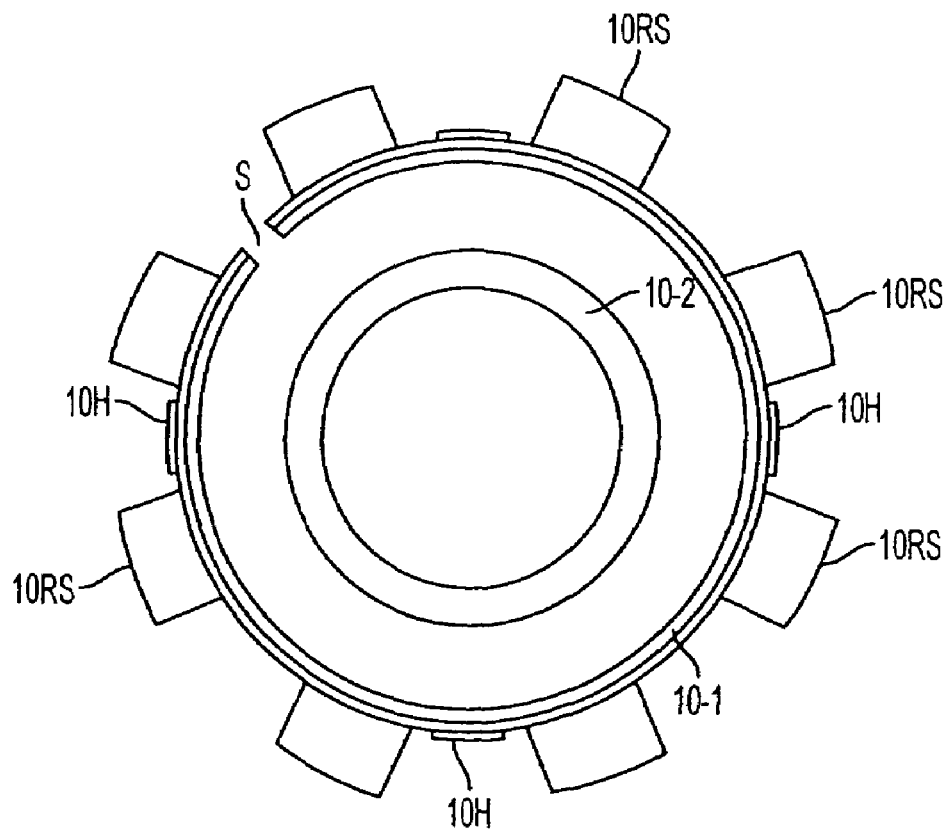
FIG. 3B shows a top view of the vibration-damping ring insert arrangement as shown in FIG. 3A.

FIG. 3A shows a sectional view of still another embodiment of a vibration-damping ring insert arrangement 10 according to the invention. This embodiment utilizes a slotted hollow-cylinder casing or member 10-1. FIG. 3B shows a view from above of the vibration-damping ring insert arrangement shown in FIG. 3A. In this version of the vibration-damping ring insert arrangement 10, four resilient retaining arms 10H extend from the hollow cylinder 10-1. Of course, any desired number of arms 10H can be utilized such as, e.g., 2, 3, or more than 4. The hollow cylinder is designated as 10-1, the vibration-damping ring as 10-2, the edge segments of the hollow cylinder as 10RS and the anti-slip and/or vibration-damping layer thereon is designated as 10-3. As is evident from FIG. 3A, the free ends of the retaining arms 10H serve to fix or secure the arrangement 10 in an opening of the component. In this regard, the component can be located between the free ends and the edge segments 10RS. To this end, the vibration-damping ring insert arrangement 10 can be inserted through a hole in the component (not shown) until the edge segments (and/or the layer 10-3) contact a surface of the component (which surface serves as a stop). Once fully inserted therein, the resilient retaining arms will naturally or automatically overlap or extend outwards over the top side or opposite surface of the component.

To ensure that the hollow cylinder 10-1 is capable of easy insertion into the component, a slot S is formed in the hollow cylinder 10-1. This slotted hollow cylinder 10-1 is also relatively easy to manufacture from a flat material by, e.g., stamping. Thus, it can be formed as a one-piece member. The slot S also ensures that the hollow-cylinder shaped vibration-damping ring insert arrangement 10 is easy to deform or compress during installation. As with the previous embodiments, the cylinder member 10-1 can be made of a metal such as, e.g., steel or spring steel.

The vibration-damping ring (1-2, 1-2$^A$ and 10-2) in each of the embodiments preferably projects beyond at least one of the ends z1 and z2 of the hollow cylinder. Preferably, the vibration-damping ring has portions on both ends which project beyond ends z1, z2. The amount of projection can be x1 or x2 (see FIG. 8). This ensures good vibration damping and a secure installation.

Figure 4:
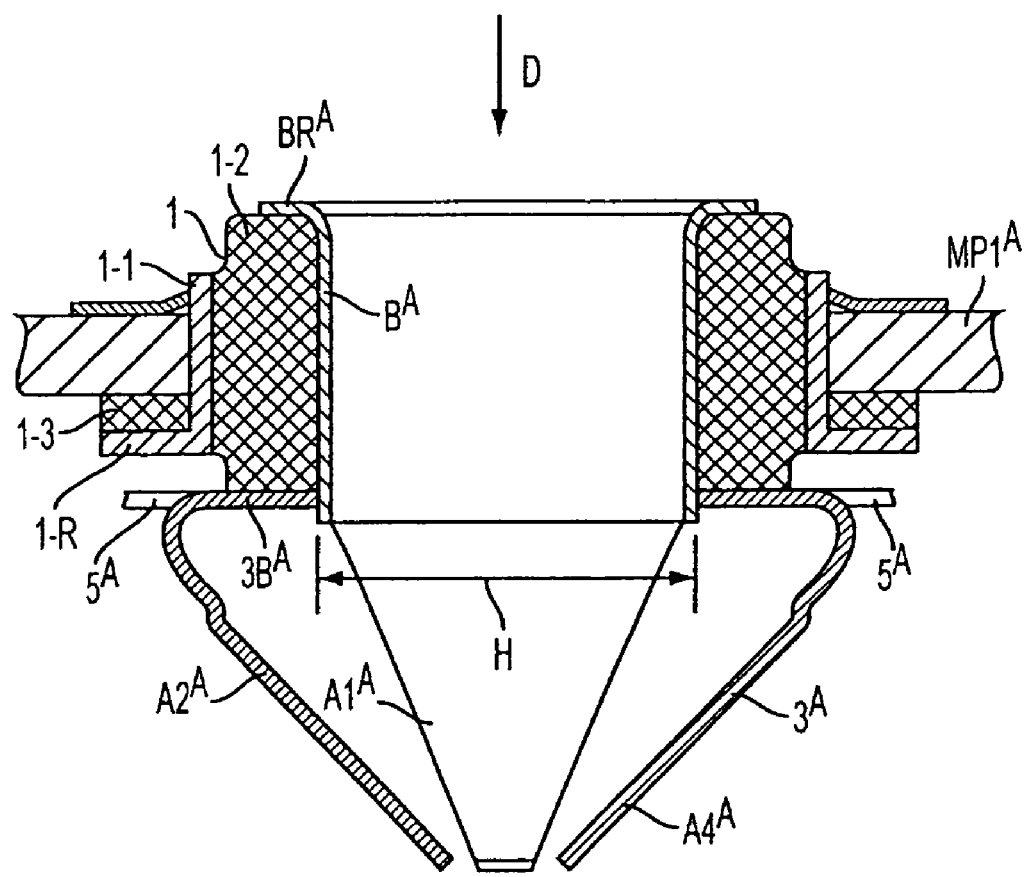
FIG. 4 shows a sectional view of the vibration-damping ring insert arrangement according to the invention as shown in FIG. 1 with a first connecting element in the form of a retaining-spring arrangement.

FIG. 4 shows a sectional view of the vibration-damping ring insert arrangement 1 shown in FIG. 1 installed on a first component MP1. In this embodiment, however, a first connecting element is mounted to the arrangement 1. The first connecting element here is in the form of a retaining-spring arrangement 3$^A$.

Figure 11B:
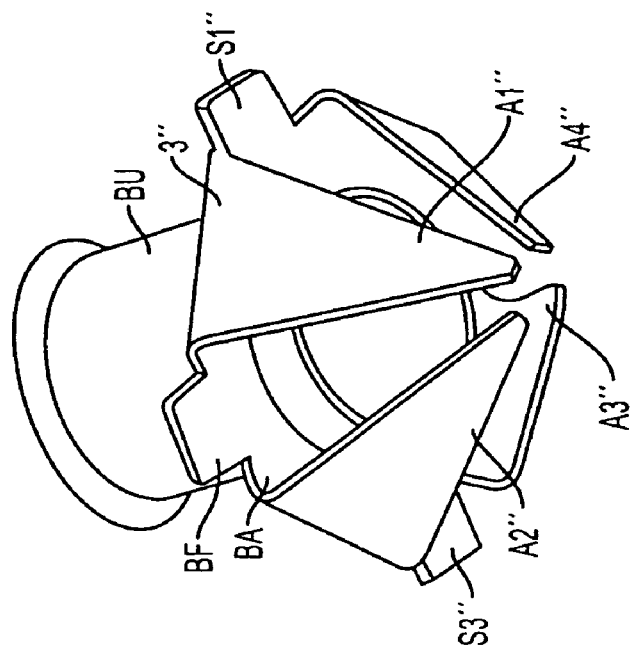
FIG. 11B shows a perspective view of a retaining-spring arrangement connected with a sleeve similar to a hollow cylinder for engagement in a vibration-damping ring (according to the prior art as disclosed in DE 200 15 848.1).

By way of non-limiting example, the retaining-spring arrangement 3$^A$ can be of the type that is known in the art from the German utility model no. 20015848.1 (see FIG. 11B). Of course, the first connecting element may have the form of any other desired device.

The sleeve portion B$^A$ of the first connecting element is arranged in an opening of the vibration-damping ring insert arrangement 1. The sleeve B$^A$ has the shape of a hollow cylinder and includes an upper edge BR$^A$ which embraces or extends over an upper edge of the opening of the vibration-damping ring 1-2. At a lower edge of the opening, the sleeve B$^A$ is connected with the base part 3B$^A$ of the first connecting element or retaining-spring arrangement 3$^A$. The arrangement 3$^A$ also includes a plurality of individual spring arms which are designated as A1$^A$, A1$^A$ (Note that A3$^A$ is concealed behind A1$^A$) and A4$^A$. Other details of the retaining-spring arrangement 3$^A$ are explained in the context of FIG. 11B, which exemplifies one possible design for the retaining-spring arrangement 3$^A$.

Figure 7:
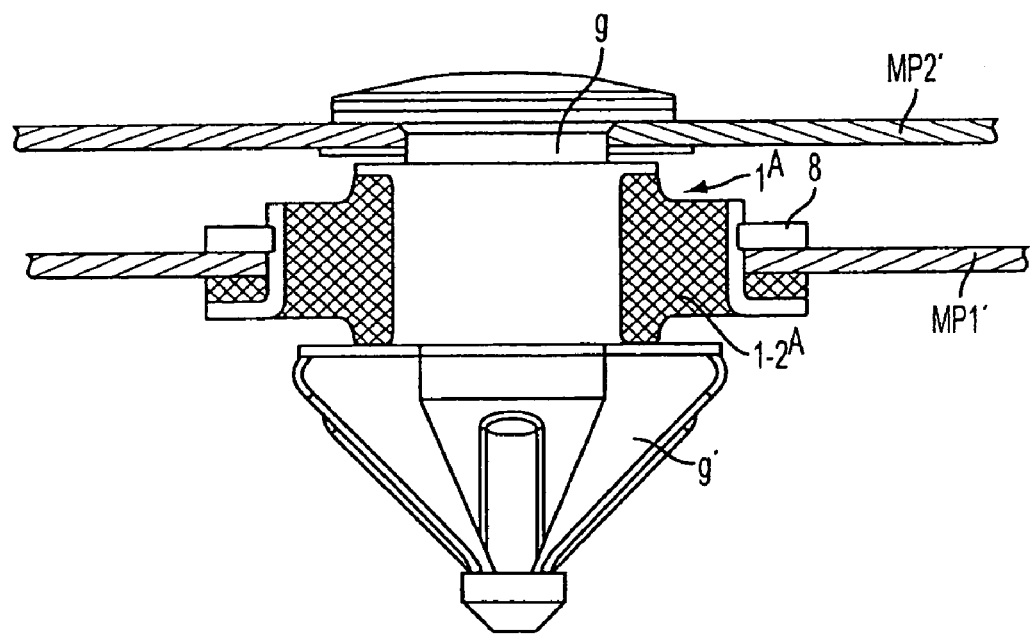
FIG. 7 shows a sectional view of a detachable connection arrangement for two components with a vibration-damping ring insert arrangement according to the invention with a retaining-spring arrangement of the type shown in FIG. 4 and a retaining bolt.
Figure 11A:
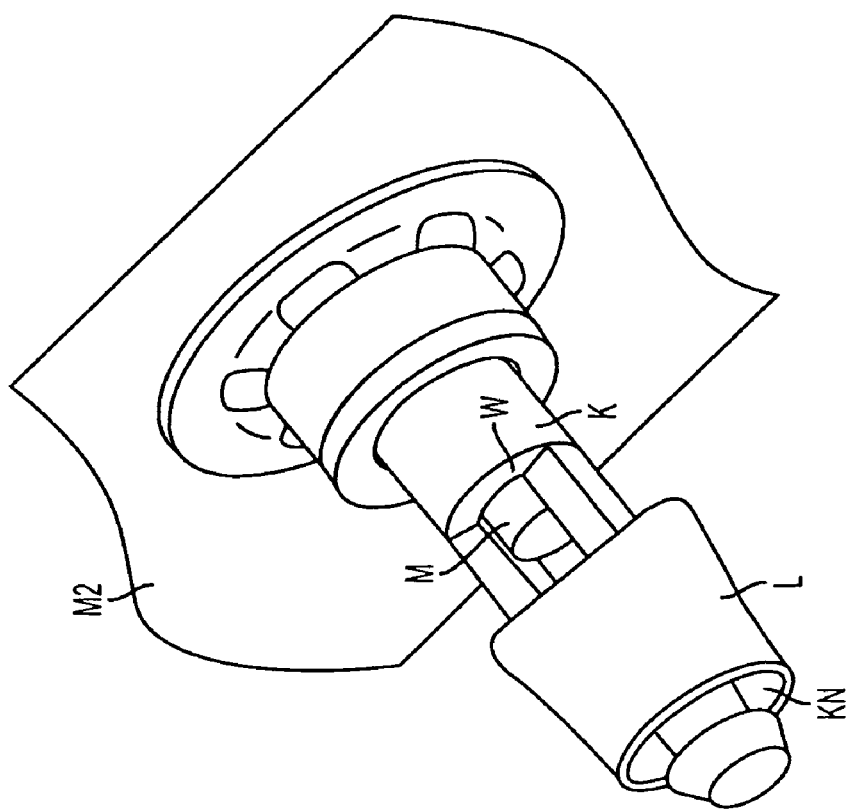
FIG. 11A shows a perspective view of a retaining bolt and a detaching part movable thereon which is operated by an activating pin which is movable axially in the retaining bolt (according to the prior art as disclosed in DE 200 15 848.1)

The retaining-spring arrangement 3$^A$ can serve to engage a retaining bolt, e.g., bolts 9 or K (see FIGS. 7 and 11A). In this regard, the bolt is first inserted into the sleeve B$^A$ in the direction D. Further details will be given in connection with FIG. 11A and FIG. 7 with regard to such installations.

Figure 5:
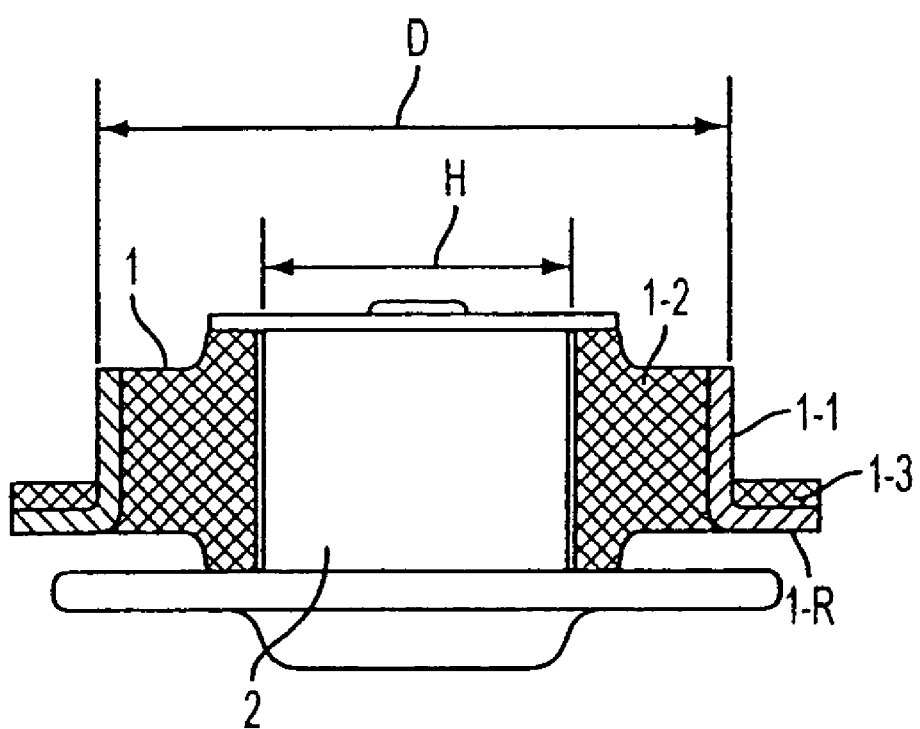
FIG. 5 shows a sectional view of the vibration-damping ring insert arrangement according to the invention as shown in FIG. 1 with a first connecting element in the form of a threaded connector.
Figure 10:
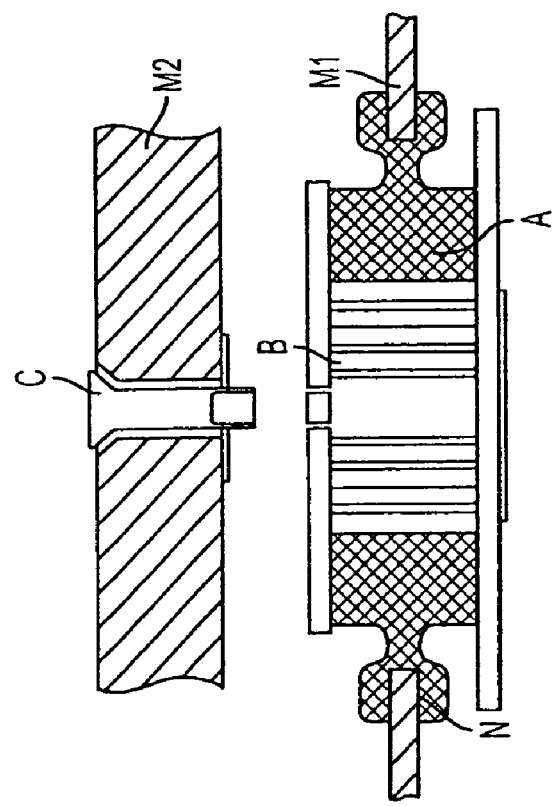
FIG. 10 shows a schematic partial sectional view of a connection arrangement for two threaded connecting elements (according to prior art in DE 299 20 495.2)

FIG. 5 shows a sectional view of still another embodiment of a vibration-damping ring insert arrangement according to the invention. This embodiment uses the arrangement shown in FIG. 1 and further includes a first connecting element which can be in the form of a threaded connector 2. The threaded connector 2 can be of the type that is known in the art from German utility model no. 299 20 495.2 (see e.g., FIG. 10). The dimensions "D" and "H" can be the diameters disclosed in this document or can be any other desired diameters.

The threaded connector 2 can thus have locking rings which are pressed together by spring force and which lock into one another. A first of these can be connected to and turned with an imaginary second connecting element in the form of a headless screw and of which the second can be pushed by spring force in an axial direction against the first and is not rotatable.

Figure 8:
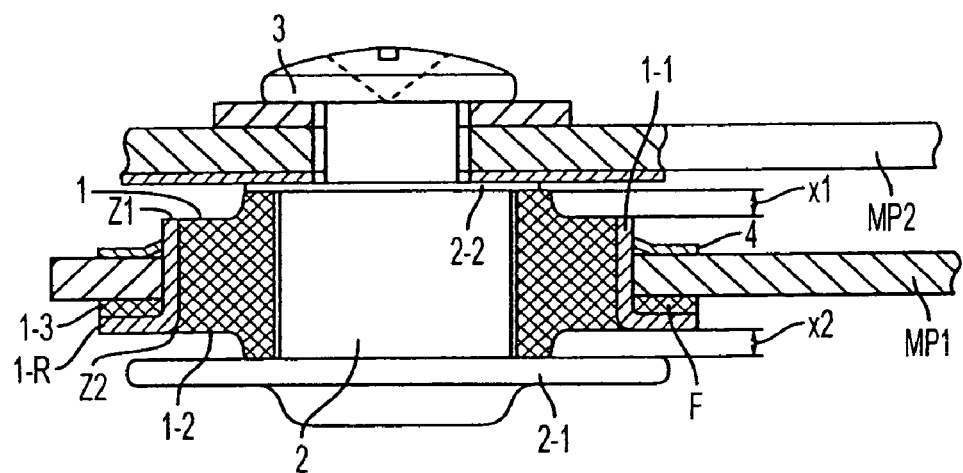
FIG. 8 shows a sectional view of a detachable connection arrangement for two components with a vibration-damping ring insert arrangement according to the invention with a threaded connector of the type shown in FIG. 5 and a screw bolt.

FIG. 8 shows a sectional view of a detachable connection arrangement connecting two components MP1 and MP2. With this connection arrangement, the vibration-damping ring insert arrangement 1 shown in FIG. 5 is mounted or arranged in a hole or opening of a first component MP1.

Figure 9:
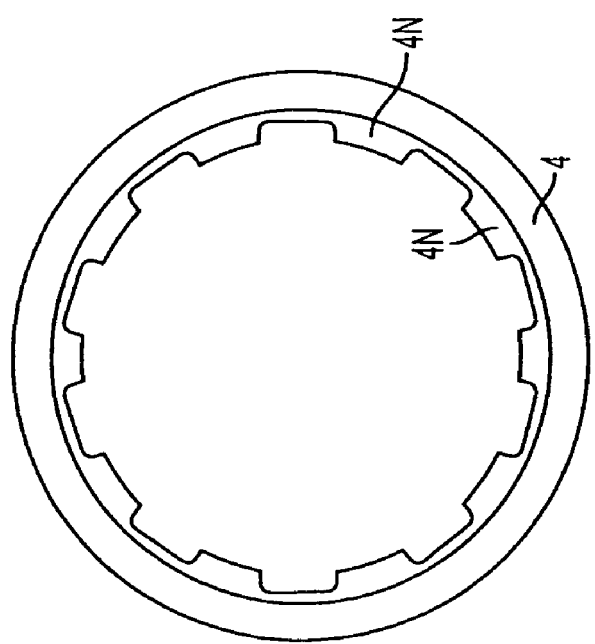
FIG. 9 shows a top view of a securing ring for attaching a component to the vibration-damping ring insert arrangement according to the invention as shown in FIG. 1, FIG. 2 or FIG. 8.

The edge of the hole is arranged between the coated 1-3 edge 1-R of the hollow cylinder part 1-1 and the securing ring 4 (which can be of the type shown in FIG. 9).

A threaded bolt 3 (which can also be of the type C in FIG. 10) passes through a hole in the second component MP2 and is connectable with the threaded connection 2 that is arranged in the vibration-damping ring insert arrangement 1. When the devices 2 and 3 are threadably connected to each other, both components MP1 and MP2 can be joined or connected together via the vibration-damping ring 1-2. As can be seen in FIG. 8, the vibration-damping ring 1-2 has portions which project from both opening ends z1 and z2 of the hollow cylinder 1-1 by the lengths x1 and x2.

Through these two projecting amounts x1 and x2, an optimum vibration-damping effect is guaranteed. The arrangement also provides for securing disks 2-1 and 2-2 arranged adjacent the sides of the vibration dampening ring 1-2. To ensure good dampening effect, the disks 2-1 and 2-2 must not also be in simultaneous contact with the hollow cylinder 1-1.

FIG. 7 shows a sectional view of a detachable connection arrangement for connecting two components MP1' and MP2' together. The connection arrangement comprises a vibration-damping ring insert arrangement 1*, which can be similar to the one shown in FIG. 4, and which includes a retaining-spring arrangement 9' which can be of the type known in the art. A retaining bolt 9 is also utilized.

The first component MP1' has a hole whose edge area is located or arranged between a securing ring 8 and the edge 1-R$^A$ of the hollow cylinder 1-1$^A$ (see FIG. 2). The retaining bolt 9, which can be e.g. of the type shown in FIG. 11A, passes through a hole in the second component MP2' and the opening of the vibration-damping ring $1\text{-}2^4$ (which is located in the hole of the first component MP1'). The bolt 9 is connected to the retaining-spring arrangement 9' by the ends of the retaining springs which hook into an engagement area KN (see FIG. 11A).

Figure 6:
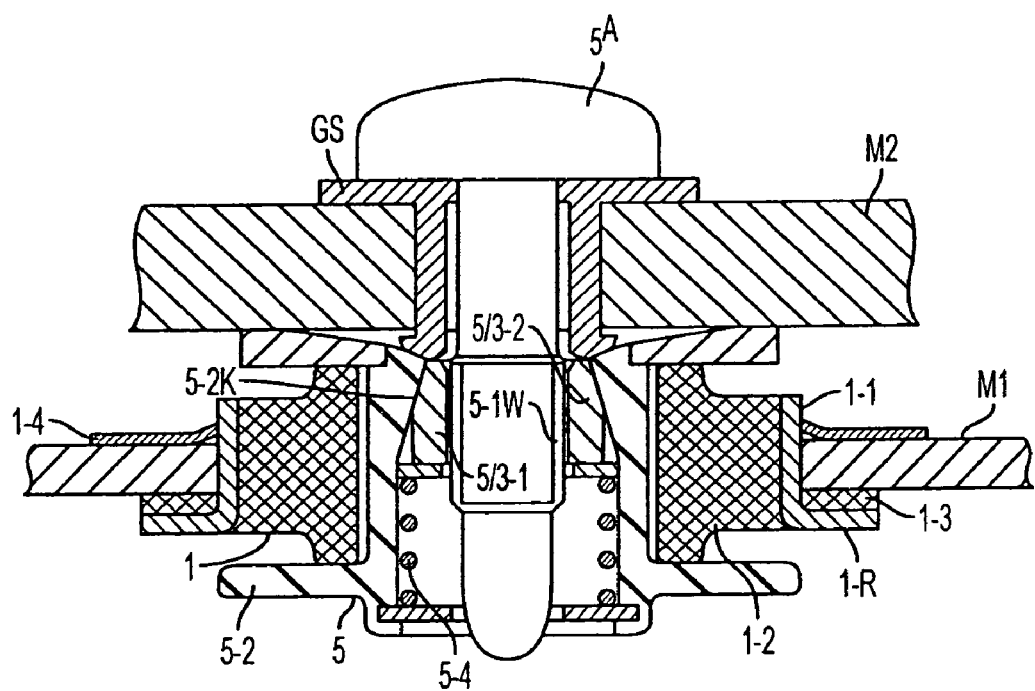
FIG. 6 shows a sectional view of the vibration-damping ring insert arrangement according to the invention as shown in FIG. 1 with a first connecting element in the form of a locking screw-in connector for connection with a second connecting element in the form of a threaded bolt.

FIG. 6 shows still another embodiment of a connection arrangement in sectional view. This arrangement uses the vibration-damping ring insert arrangement 1 of the type shown in FIG. 1 and further includes a first connecting element in the form of a locking screw-in connector 5. The connector 5 connects with a second connecting element which is in the form of a threaded bolt $5^4$.

The first connecting element can be a bolt connector 5 of the type known in the art and can be located or arranged in the opening of the vibration-damping ring 1-2. The connector 5 has a housing portion 5-2 which includes an inner taper 5-2K which tapers towards its opening and which serves to receive the end of the retaining threaded bolt $5^4$. The retaining threaded bolt $5^4$ thus acts as the second connecting element. At least two shell-shaped threaded-nut segments 5/3-1, 5/3-2 are located or arranged in the housing 5-2. These devices 5/3-1 and 5/3-2 have the form of outer casings and include a bevel which is arranged to fit or engage with the interior taper 5-2K.

The threaded-nut segments 5/3-1 and 5/3-2, with their outer casing, are movable relative to the interior taper 5-2K and can move (e.g., axially) towards or away from the housing opening. The threaded-nut segments 5/3-1 and 5/3-2 are also subjected to or biased by a spring 5-4 which applies a force towards the housing opening. The spring 54 thus causes the outer tapered surfaces of the segments 5/3-1 and 5/3-2 to engage inner tapered surface 5-2K of the housing 5-2. The retaining screw bolt $5^4$ can be pushed against the biasing force of the spring 54 between the movable threaded-nut segments 5/3-1 and 5/3-2 in such a way that the external thread 5-1W of the bolt $5^4$ locks into the internal thread of the threaded-nut segments 5/3-1 and 5/3-2. The retaining screw-bolt thread 5-1W can thus be threadably connected with the thread of the threaded-nut segments 5/3-1 and 5/3-2 by turning or rotating the retaining screw-bolt $5^4$.

The first component M1 is located in the edge area of a hole between the edge 1-R of the vibration-damping ring insert arrangement 1 and a securing ring 14. The second component M2 is encompassed by a guide sleeve GS for the retaining screw bolt $5^4$ in the edge area of a hole.

Of course, the invention contemplates the use of first and/or second connecting elements of other types and is not limited to those shown in FIGS. 4, 5 and 6.

For certain applications, e.g., in the aircraft industry, the connection arrangement will need to be small and lightweight. Accordingly, the dimensions "D" and "H" shown in FIG. 5 can be, e.g., D=approximately 14 mm and H=approximately 7 mm. Depending on the vibrations which are occurring, a certain vibration range may be specified for the structure. For example, in the aircraft technology environment, the dimensions for "x1" and "x2" in FIG. 8 can be, e.g., x1=at least approximately 1 mm and x2=at least approximately 1 mm, depending on or in accordance with the requirement for a vibration buffer. For applications in which greater size and weight are possible, the dimensions for "D" and "H" may also be in the cm (centimeter) or dm (decimeter) ranges or order of magnitude. For higher vibration amplitude, the dimensions "x1" and "x2" may also be in the cm (centimeter) range or order of magnitude.

It is noted that the foregoing examples have been provided merely for the purpose of explanation and are in no way to be construed as limiting of the present invention. While the present invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed is:

1. A vibration-damping ring insert arrangement, comprising:
    a vibration-damping ring;
    a hollow cylinder member comprising a first end, a second end, and an inner surface that is connected to an outer surface of the vibration-dampening ring;
    the vibration-damping ring comprising a through opening, a first annular projecting portion, and a second annular projecting portion, the first and second annular projecting portions extending respectively beyond the first and second ends of the hollow cylinder member;
    the second end of the hollow cylinder member comprising an annular surface which extends substantially perpendicular to an axis running through the hollow cylinder member;
    a vibration-damping material permanently connected or non-removably fixed to the annular surface of the second end;
    the vibration-damping material comprising a rubber or elastomeric layer; and
    a plurality of holding elements extending outwardly from an outer surface of the hollow cylinder member, whereby the plurality of holding elements are adapted to secure the hollow cylinder member in an opening of a component.

2. The arrangement of claim 1, wherein the first and second annular projecting portions extend respectively beyond the first and second ends of the hollow cylinder member by substantially equal amounts.

3. The arrangement of claim 1, wherein the annular surface is arranged on one of an outwardly extending edge and outwardly extending edge segments.

4. The arrangement of claim 1, wherein the hollow cylinder member is made of metal.

5. The arrangement of claim 1, wherein the hollow cylinder member comprises a slot.

6. The arrangement of claim 1, wherein the hollow cylinder member comprises a circumferential retaining groove.

7. The arrangement of claim 1, further comprising a securing ring adapted to engage with the hollow cylinder member.

8. The arrangement of claim 7, wherein the securing ring is adapted to engage with the circumferential retaining groove.

9. The arrangement of claim 1, further comprising a securing ring adapted to engage with the hollow cylinder member.

* * * * *